3,157,461
DOUBLE OXIDE OF URANIUM AND COPPER
James S. Gill, Knoxville, and William L. Marshall,
Oak Ridge, Tenn.
Filed July 27, 1960, Ser. No. 45,650
11 Claims. (Cl. 23—14.5)

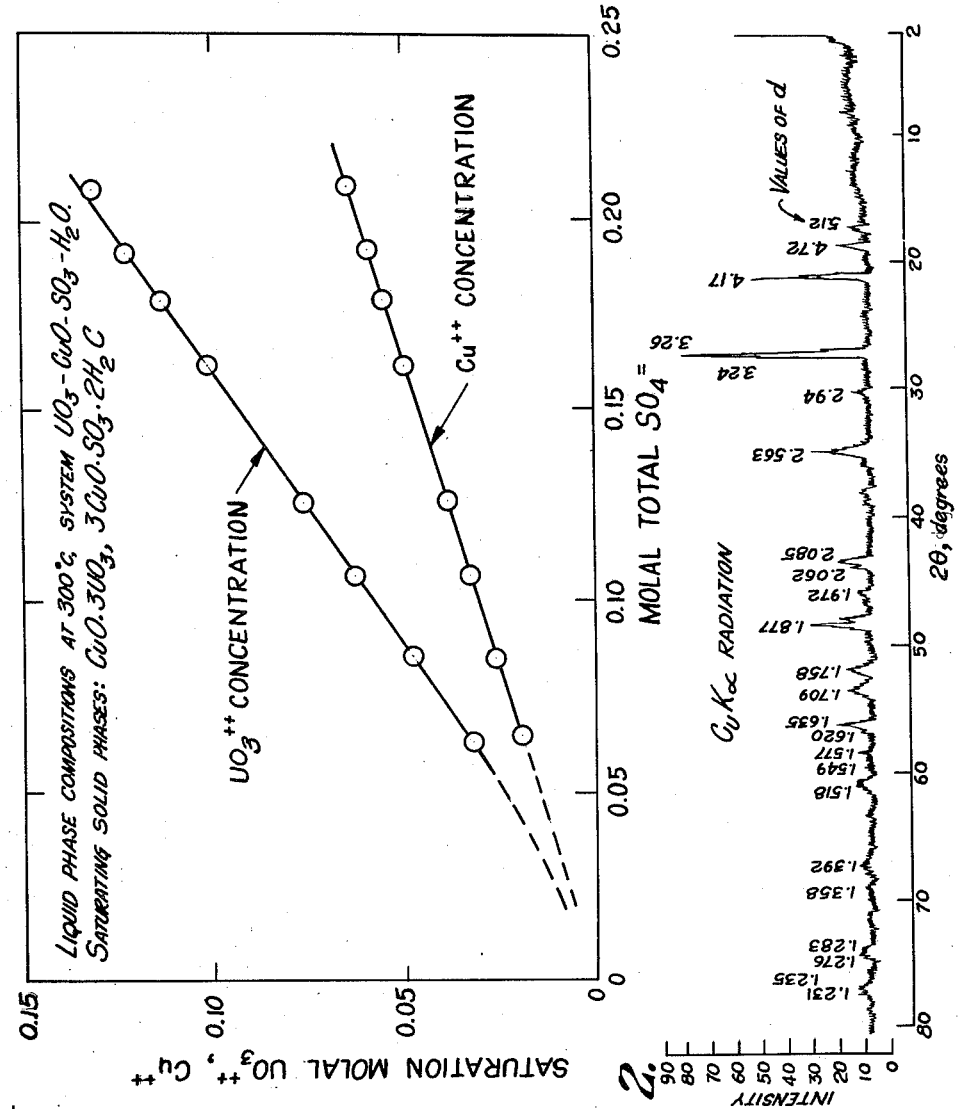

This invention relates generally to a new composition of matter and to a method of producing such compounds. More particularly, this invention relates to a general method of preparation of a double oxide and to the compounds so produced.

Catalysts have played an important part in the production of many products which otherwise might not have been made, or at least might be made more economically than heretofore. Constant research has sought to improve the catalyst in every conceivable manner. In many instances, purity is the vital factor. In others, it is the physical presentation of the catalyst to the reactants that is critical. While in others, it is the molecular arrangement and bonding between the atoms of one compound or the bonding between the molecules of different compounds that makes the difference between the success or failure of a particular catalyst.

It is well known that various oxides, particularly certain irreducible oxides of metals within the second to the sixth groups in the periodic system are unusually active as catalysts. Such oxides within this grouping have been found to induce a particular reaction at lower temperatures, since their high activity reduces the amount of heat transfer required. Obviously, such effective catalysts will initiate operating efficiencies and reduce the cost of the product.

For instance, in the manufacture of hydrogen, it has been found that a mixture of certain irreducible metallic oxides within the second to the sixth grouping in the periodic table catalyze the reaction of steam and carbon monoxide to produce hydrogen. However, these oxides heretofor found useful are not chemically combined, but rather are only physical mixtures obtained through purely physical means.

Consequently, it is an important general object of this invention to provide a new multiple compound containing different metals which is chemically formed from two different metallic compounds.

A more particular object of this invention is to provide a new double metallic compound including a double oxide of uranium and copper.

Another object of this invention is to provide a novel method of preparation for a double oxide which is made from individual metallic compounds.

A further and more particular object of this invention is the provision of a method for the preparation of the double oxide of uranium and copper.

These and other objects of the invention will be apparent and the invention understood by reference to the following specification and the drawing, in which the details of the invention and preferred embodiments are described.

This invention presents a novel method of preparing a double oxide by the application of heat and pressure under conditions wherein the original solid charge of the individual compounds is solvated by a weak solvent and which then precipitates out as the new double oxide.

This novel method of preparing the novel double oxide of uranium and copper is illustrated in the following examples which are supplemented by the drawing.

FIG. 1 gives representative solubility curves at a temperature of 300° C. to indicate the range of solution compositions of Example I in which the two solids

and $CuO—3UO_3$ are stable phases; and

FIGURE 2 is a plot of the X-ray diffraction data given in Table II.

EXAMPLE I

Reagent grade $UO_3 \cdot H_2O$, $CuO$ and $H_2SO_4$ in $H_2O$ solution were equilibrated for periods of time ranging from 3 hours to 6 days at 300° C. temperature and under pressure. The apparatus for equilibrating solid-solution mixtures was similar to the apparatus reported previously by W. L. Marshall, Analytical Chemistry, 27, 1923 (1955), except eight pressure vessels were placed in one thermostat. Liquid samples at 300° C. were removed from a pressure vessel by way of a titanium capillary tubing, passed through a cold trap and analyzed. Equilibrium was shown to exist by sampling and analyzing the solution phase over a period of time until no change in concentration was found. Usually equilibrium was achieved in 3 to 6 hours. After an experimental run the pressure vessels containing the remainder of saturated solution and solid phases were quenched in ice water. During this operation the bombs were inverted so that solids which may have stuck to the walls of the vessels were not in contact with liquid, thereby reducing the possibility of these particular solids changing composition as the temperature was lowered. The solids and remaining liquid phase were removed from each pressure vessel. After a few washings with water, the solids were dried between filter paper.

EXAMPLE II

Reagent grade $UO_3 \cdot H_2O$, $Cu(OH)_2$ in $NH_3$—$H_2O$ were heated at 100° C. to attain equilibrium between the solid and liquid phases.

In Example I it was determined that the solid phase which was in equilibrium with the liquid phase was actually composed of two different phases (1)

(mineral name, antlerite), and (2) the new compound, red $CuO \cdot 3UO_3$. In Example II, the new compound $CuO \cdot 3UO_3$ was found. Representative solubility curves at a temperature of 300° C. are given in FIGURE 1 to indicate the range of solution compositions of Example I, in which these two solids were stable phases.

Separation of the respective solids in Example I was effected by preparing a glycerin-water solution of appropriate density and viscosity, slurrying the solids in this solution, centrifuging the slurry, and physically removing the lighter $3CuO \cdot SO_3 \cdot 2H_2O$ from the top of the settled mixture. After three such operations the separation approached 100%.

The identification of the red solid was attempted by analyzing for uranium and copper by controlled-potential coulometric titration, according to the method of W. D. Shults and P. F. Thomason, Analytical Chemistry, 31, 492 (1959). These data are given in Table I.

Table I

COMPOSITIONS BY CHEMICAL ANALYSIS FOR SIX PREPARATIONS OF $CuO \cdot 3UO_3$

| | Wt. Percent | | | | | Molar Ratio, $UO_3/CuO$ |
|---|---|---|---|---|---|---|
| | U | Cu | $SO_4$ | Calcd. from Data for U and Cu | | |
| | | | | [O] | $CuO+UO_3$ | |
| | 75.76 | 6.92 | 0.64 | 17.0 | 99.7 | 2.92 |
| | 76.30 | 7.02 | <0.07 | 17.1 | 100.4 | 2.90 |
| | 74.72 | 7.05 | -------- | 16.8 | 98.6 | 2.83 |
| | 73.91 | 7.14 | -------- | 16.7 | 98.0 | 2.76 |
| | 75.18 | 7.23 | <0.07 | 17.0 | 99.6 | 2.77 |
| | 73.90 | 6.90 | <0.07 | 16.6 | 97.4 | 2.85 |
| Average | 74.96 | 7.04 | -------- | 16.8 | 98.9 | 2.84 |
| Calculated for: | | | | | | |
| $CuO \cdot 3UO_3$ | 76.16 | 6.78 | -------- | 17.1 | 100.0 | -------- |
| $CuO \cdot 3UO_3[O]$ | 74.89 | 6.66 | -------- | 18.4 | 98.3 | -------- |
| $CuO \cdot U_3O_8 \cdot H_2O$ | 76.00 | 6.76 | -------- | 17.0 | 99.8 | -------- |
| $CuO \cdot 3UO_3 \cdot H_2O$ | 74.73 | 6.65 | -------- | 18.4 | 98.1 | -------- |

Weight percent values for $[CuO+UO_3]$ and for $[O]$ included in Table I were calculated from the analytical data for uranium and copper. Each set of analyses for uranium and copper was performed on a different batch of separated solid phase which originated from a different experimental solubility run at 300° C. These analyses indicated an average value of 2.84 moles of $UO_3$ per mole of CuO and was 5.3% lower than a theoretical value of 3.00. The experimentally found lower molar ratio was attributed both to incomplete removal of $$3CuO \cdot SO_3 \cdot 2H_2O$$

from $CuO \cdot 3UO_3$ and to partial occlusion of solution with the separated $CuO \cdot 3UO_3$ solid. Both occurrences would contribute to a smaller ratio than 3.0 but still would not allow the sum of CuO and $UO_3$ to deviate far from 100%. If the average lowered molar ratio value of 2.84 for the solid were due to occluded or incompletely separated $3CuO \cdot SO_3 \cdot 2H_2O$ then the expected sulfate content would have been 0.19%. The several analytical values for sulfate anion in Table I are somewhat less than this order of magnitude.

Other compositions which were considered initially to be within or near the experimental precision of the data were $CuO \cdot U_3O_{10}$, $CuO \cdot U_3O_8 \cdot H_2O$, and $CuO \cdot 3UO_3 \cdot H_2O$. The theoretical weight percent for U, Cu, O, and $CuO+UO_3$ for these compositions in addition to $$CuO \cdot 3UO_3$$

are listed in Table I. The analytical data for uranium favor slightly $CuO \cdot U_3O_{10}$ and $CuO \cdot 3UO_3 \cdot H_2O$ whereas the values for the weight percent [O] favor strongly $CuO \cdot 3UO_3$ and $CuO \cdot U_3O_8 \cdot H_2O$. The composition, $CuO \cdot U_3O_{10}$, i.e., $CuO \cdot 3UO_3 \cdot [O]$, was eliminated from consideration due to nonstoichiometry. The structures containing $H_2O$ were considered unlikely since the solid was found to be thermally stable to above 830° C., thus leaving $CuO \cdot 3UO_3$ as the most favored composition.

In an effort to utilize the conclusion that $CuO \cdot 3UO_3$ is the actual formula of the red solid formed in Example I, to prepare the pure compound the following procedure was used:

EXAMPLE III

Reagent grade CuO and $UO_3 \cdot H_2O$ solids in a 1:3 molar ratio, $CuO/UO_3$, was added to a 300 cc. capacity closed pressure vessel containing a .06 molal $H_2SO_4$ solution. The vessel was heated to 300° C., producing equilibrium between the reactants and the products. As in Example I above, samples were withdrawn to determine whether the solid phase had changed in composition. The results showed that the dissolution was slight and the solid remained near the 1:3 molar ratio $CuO/UO_3$, thus tending to substantiate the red compound formed is in fact $CuO \cdot 3UO_3$.

To further identify the new compound, the refractive index was determined by conventional methods and apparatus to be 2.1, which is quite high when compared to a few other oxides of this type. Observations of $CuO \cdot 3UO_3$ crystals under a microscope showed crystalline structures of considerable clarity, the macrocrystalline dimensions of which averaged 0.12 mm. on edge.

X-ray diffraction data are given in FIGURE 2 and Table II, which seem to indicate orthorhombic symmetry.

Table II

POWDER PATTERN X-RAY DIFFRACTION LINES FOR $CuO \cdot 3UO_3$ (CuKα RADIATION)

| Relative Peak Height | d | Relative Peak Height | d |
|---|---|---|---|
| 6 | 5.12 | 10 | 1.709 |
| 10 | 4.72 | 15 | 1.635 |
| 46 | 4.17 | 4 | 1.620 |
| 79 | 3.26 | 5 | 1.577 |
| 45 | 3.24 | 1 | 1.549 |
| 7 | 2.94 | 5 | 1.518 |
| 23 | 2.563 | 5 | 1.392 |
| 13 | 2.085 | 2 | 1.358 |
| 9 | 2.062 | 4 | 1.283 |
| 6 | 1.972 | 4 | 1.276 |
| 25 | 1.877 | 6 | 1.235 |
| 9 | 1.758 | 6 | 1.231 |

Table III

THERMAL STABILITY OF $CuO \cdot 3UO_3$

| Run No. | Temp., °C. | Time in Hrs. at Each Temp. | Net Wt. of Solid | Percent Change in Weight (From Wt. at 100° C.) |
|---|---|---|---|---|
| 1 | 110 | 24 | 1.0092 | -------- |
|   | 400 | 17 | 1.0087 | -0.05 |
|   | 520 | 1.5 | 1.0071 | -.21 |
|   | 670 | 17 | 1.0056 | -.36 |
|   | 720 | 64 | 1.0056 | -.36 |
|   | 830 | 16 | 1.0054 | -.38 |
|   | 950 | 16 | .9836 | -2.57 |
|   | 950 | 32 | .9824 | -2.66 |
|   | 950 | 48 | .9821 | -2.68 |
| 2 | 110 | 16 | 1.2902 | -------- |
|   | 830 | 16 | 1.2857 | -0.35 |
|   | 830 | 16 | 1.2856 | -.36 |
|   | 830 | 16 | 1.2856 | -.36 |
|   | 830 | 40 | 1.2856 | -.36 |
|   | 830 | 16 | 1.2857 | -.35 |
|   | 830 | 16 | 1.2857 | -.35 |
| 3 | 110 | 16 | .9632 | -------- |
|   | 880 | 16 | .9570 | -0.64 |
|   | 920 | 96 | .9473 | -1.65 |
| 4 | 110 | 16 | 1.2754 | -------- |
|   | 1,000 | 16 | 1.2496 | -2.02 |

The thermal stability of the compound was investigated by first placing a weighed quantity of $CuO \cdot 3UO_3$ in a platinum crucible, drying at 110° C. for 16 hours, and reweighing the crucible and contents. The dried quantity of $CuO \cdot 3UO_3$ was held at several higher temperatures for varying lengths of time and reweighed after each duration at temperature. The results listed in Table III showed no appreciable changes in weight until a temperature above 830° C. was reached. The stability at 830° C. was verified by X-ray diffraction data which showed no change from the initial pattern for $CuO \cdot 3UO_3$ at room temperature or after being dried at 110° C. The X-ray diffraction pattern for two samples heated above 900° (third and fourth runs, Table III) showed decomposition to $U_3O_8$ and to an unidentified compound or compounds. Some diffraction lines seemed to indicate CuO but a complete set of lines for CuO was absent. However, a theoretical conversion from $CuO \cdot 3UO_3$ to $CuO + U_3O_8$ corresponds to a $-1.71\%$ change in weight which is nearly consistent with the $-1.65\%$ and $-2.02\%$ changes found in the third and fourth runs, Table III. The decrease of $-2.68\%$ (first run, Table III) may have indicated some decomposition to $Cu_2O + U_3O_8$ (theoretical change = $-2.5\%$). A thermal stability for $CuO \cdot 3UO_3$ to between 830 and 920° C. was unexpected, since most other compounds involving hexavalent uranium decompose in the 350 to 600° C. temperature range.

At 25° C., $CuO \cdot 3UO_3$ is not easily soluble in dilute or concentrated $HNO_3$ or $H_2SO_4$ but is readily soluble at 100° C. in these acids.

The velocity of the combination reaction to form $CuO \cdot 3UO_3$ was found to be increased considerably over a rate in water alone, due to the solvation of solids by the dilute acid and subsequent recrystallization. Since this method for the synthesis of large amounts of $CuO \cdot 3UO_3$ in dilute solution was found to be successful, it is being used in this laboratory for the preparation of other solids which are in equilibrium with very dilute solutions and which would be difficult to prepare in quantity by other methods.

In later solubility studies, in order to be assured that large amounts of the two solids were present under equilibrium conditions, an excess of $3CuO \cdot SO_3 \cdot 2H_2O$ together with a mixture of CuO and $UO_3 \cdot H_2O$ of 1:3 molar ratio, $CuO/UO_3$, was added to dilute $H_2SO_4$ solutions. In these cases the two solids were found in large amounts at equilibrium and were separated by the centrifugation method described above.

The pressure referred to above and in the claims is that which is the total vapor pressure of the reactants within the closed pressure vessel at the particular operating temperature.

The solvents that may be found useful in addition to those mentioned above include those which are ionizable to a substantial degree, among which are acids such as $H_3PO_4$, $HNO_3$ and HCl, etc., and bases such as KOH, NaOH, LiOH, etc. Broadly stated, it was discovered that a solvent having an oxide solvating anion which permits the reprecipitating of the oxides in the form of the double oxide are useful in this process.

In use the new compound $CuO \cdot 3UO_3$ may be substituted for many types of uranium oxide catalysts utilized in processes for production of various products.

From the foregoing detailed description, it will be evident that there are a number of changes, adaptations, and modifications of the present invention which come within the province of those skilled in the art. However, it is intended that all such variations not departing from the spirit of the invention, be considered as within the scope thereof as limited solely by the appended claims.

What is claimed is:
1. The compound $CuO \cdot 3UO_3$.
2. The double oxide of uranium and copper selected from the group consisting of those compounds having the following general formula:

$$CuO \cdot (4-a)U_aO_b[O]_c \cdot (d)H_2O$$

wherein
 (a) is 1 or 3,
 (b) is 3 when $a=1$; and $b=8$ when $a=3$,
 (c) is 1 when $d=0$ or 0 when $d=1$,
 (d) is 1 or 0.

3. A double oxide of uranium and copper having the following general properties:
 (a) X-ray diffraction pattern $CuK_a$ radiation

| Relative Peak Height | d | Relative Peak Height | d |
|---|---|---|---|
| 6 | 5.12 | 10 | 1.709 |
| 10 | 4.72 | 15 | 1.635 |
| 46 | 4.17 | 4 | 1.620 |
| 79 | 3.26 | 5 | 1.577 |
| 45 | 3.24 | 1 | 1.549 |
| 7 | 2.94 | 5 | 1.518 |
| 23 | 2.563 | 5 | 1.392 |
| 13 | 2.085 | 2 | 1.358 |
| 9 | 2.062 | 4 | 1.283 |
| 6 | 1.972 | 4 | 1.276 |
| 25 | 1.877 | 6 | 1.235 |
| 9 | 1.758 | 6 | 1.231 |

(b) experimental weight composition 74.96% U, 7.04% Cu, 16.8% [O], 98.9% [$CuO+UO_3$],
 (c) a molar ratio $UO_3/CuO$ of 2.84,
 (d) refractive index of 2.1,
 (e) substantial thermal stability at temperatures up to 830° C. for 120 hours.

4. The process of producing a solid double oxide of copper and uranium comprising mixing uranium oxide and copper oxide with a solvent, said solvent comprising water and an ionic inorganic compound containing an oxide-solvating antion, heating the resulting solution to a temperature between approximately 100° C. and 300° C. under pressure to produce equilibrium between the liquid and solid phases and separating the double oxide from the liquid phase.

5. The process defined in claim 4, wherein the copper oxide and uranium oxide are in a 1:3 molar ratio.

6. The process defined in claim 4, wherein the solvent is dilute and selected from the group consisting of aqueous ammonia and aqueous sulphuric acid.

7. The process of producing $CuO \cdot 3UO_3$ comprising the steps of mixing CuO and $UO_3 \cdot H_2O$ in a dilute solvent, said solvent comprising water and an ionic inorganic compound containing an oxide-solvating anion, heating the resulting solution within a closed pressure vessel to between 100° C. and 300° C., to equilibrate solid and liquid phases and removing solid $CuO \cdot 3UO_3$.

8. The process defined in claim 7, wherein the solvent is an aqueous dilute solution of a compound selected from the group consisting of $NH_3$ and $H_2SO_4$.

9. The process of producing a double oxide of copper and uranium comprising the steps of solvating CuO and $UO_3 \cdot H_2O$ in a dilute aqueous solvent, said solvent comprising water and an ionic inorganic compound containing an oxide solvating anion, at a temperature of from approximately 100° C. to 300° C. within a closed pressure vessel, to precipitate a solid phase portion having a 1:3 molar ratio $CuO/UO_3$ and separating the precipitated solid phase from the liquid phase.

10. The process of producing a double oxide of copper and uranium comprising the steps of solvating CuO and $UO_3 \cdot H_2O$ in a dilute aqueous solution of a compound selected from the group consisting of $NH_3$ and $H_2SO_4$ at a temperature of between approximately 100° C. and 300° C. within a closed pressure vessel to produce a solid phase portion having a 1:3 molar ratio and separating said solid phase portion.

11. The process defined in claim 10, wherein added CuO and $UO_3 \cdot H_2O$ are in a 1:3 molar ratio and the temperature is 300° C.

References Cited in the file of this patent

AEC Document ORNL–2386, pp. 80–82, October 28, 1957.

AEC Document ORNL–2696, pp. 205–213, April 16, 1959.

AEC Document ORNL–2473, pp. 227–230, 237, August 8, 1959.

Clark et al.: "J. of Chemical and Engineering Data," vol. 4, No. 12 (1959), TP114.